United States Patent
Hitzigrath et al.

[11] Patent Number: 5,553,461
[45] Date of Patent: Sep. 10, 1996

[54] ANTI-ICING HEAT EXCHANGER FOR AIRCRAFT AIR CYCLE PERFORMANCE ENHANCEMENT

[75] Inventors: Richard W. Hitzigrath, Sayville; Melvin Schreiber, Roslyn, both of N.Y.

[73] Assignee: Grumman Aerospace Corporation, Los Angeles, Calif.

[21] Appl. No.: 371,431

[22] Filed: Jan. 11, 1995

[51] Int. Cl.$^6$ ........................................ F25D 9/00
[52] U.S. Cl. .................. 62/150; 62/172; 62/402; 62/513; 62/434
[58] Field of Search .............. 62/402, 172, 513, 62/434, 150; 165/104.33

[56] References Cited

U.S. PATENT DOCUMENTS

| | | | |
|---|---|---|---|
| 3,428,242 | 2/1969 | Rannenberg | 62/402 |
| 4,430,867 | 2/1984 | Warner | 62/402 |
| 4,535,606 | 8/1985 | Rannenberg | 62/402 |
| 4,553,407 | 11/1985 | Rannenberg | 62/402 |
| 5,137,079 | 8/1992 | Anderson | 165/104.33 |

*Primary Examiner*—John K. Ford
*Attorney, Agent, or Firm*—Terry J. Anderson; Karl J. Hoch, Jr.

[57] ABSTRACT

Unconditioned, sub-freezing turbine exhaust air is employed to cool liquid coolant from radar electronics in an aircraft. This is accomplished by utilizing a liquid/air exchanger. However, in order to ensure that the air-cooled heat exchangers do not experience freezing of moisture droplets, sufficient heat is supplied to a liquid/air heat exchanger, located at the turbine exhaust, to maintain all surfaces (fins) above freezing, and also to heat the entire turbine exhaust air stream to a temperature above freezing as it exits that heat exchanger. Use of this anti-icing liquid/air heat exchanger, in conjunction with the proper air and liquid flow controls, will permit savings of total cooling air (i.e., engine bleed air) flow by negating the need for a hot air bypass to reheat turbine exhaust air.

4 Claims, 2 Drawing Sheets

ANTI-ICING HEAT EXCHANGER FOR AIRCRAFT AIR CYCLE PERFORMANCE ENHANCEMENT

FIELD OF THE INVENTION

The present invention relates to cooling systems, and more particularly to a liquid/air heat exchanger for high performance aircraft.

BACKGROUND OF THE INVENTION

As modern aircraft, particularly military aircraft, require greater and greater cooling to absorb heat from avionics and particularly radar, the trend is toward more use of liquid coolant to transfer heat from the avionics, and even the cabin, to cold air from the air conditioning system.

A conventional method for accomplishing such cooling is an open-loop air cycle cooling system which supplies cooled air from a turbine to cool liquid coolant which is associated with a cooling system for electronics such as radar. Heat exchange between the liquid and cold air occurs in a liquid/air heat exchanger, but a principal limitation in efficiency exists in the maintenance of above-freezing conditions in the cold air flow path to prevent ice buildup at the liquid heat exchanger. The air cycle turbine flow must be reheated above freezing to prevent icing of entrained water in the flow path; this reheating diminishes the air cycle system's cooling capacity.

A conventional solution to this problem is to create an anti-ice bypass around the air cycle turbine and compressor, such bypass channeling hot air to mix with turbine exit air, controlled to 40° F. or more. The utilization of a substantial bypass represents a parasitic load and in general decreases the efficiency of the process, resulting in more engine bleed air usage.

BRIEF DESCRIPTION OF THE PRESENT INVENTION

The present invention is an improvement of the typical open-loop air cycle cooling system in conjunction with a liquid cooling system. The air cycle could be either a simple, or boot strap configuration. With the present invention reheating of turbine exhaust occurs using a liquid/air heat exchanger which does useful cooling but remains free of ice. Bleed air usage is reduced by the reduction of hot bypass flow around the air cycle compressor-turbine assembly.

In the present invention a liquid/air heat exchanger is located immediately downstream of the turbine, where it accepts un-conditioned turbine exhaust at below-freezing temperatures, instead of accepting mixed air which is controlled to above-freezing temperatures. This heat exchanger is "run wet," that is, all surfaces within the heat exchanger are kept above 40° F., and therefore free of ice, by virtue of the hot liquid. Useful cooling of hot liquid is therefore accomplished while raising the turbine flow above 40° F.

BRIEF DESCRIPTION OF THE FIGURES

The above-mentioned objects and advantages of the present invention will be more clearly understood when considered in conjunction with the accompanying drawings, in which.

DETAILED DESCRIPTION OF THE INVENTION

Figure 1:
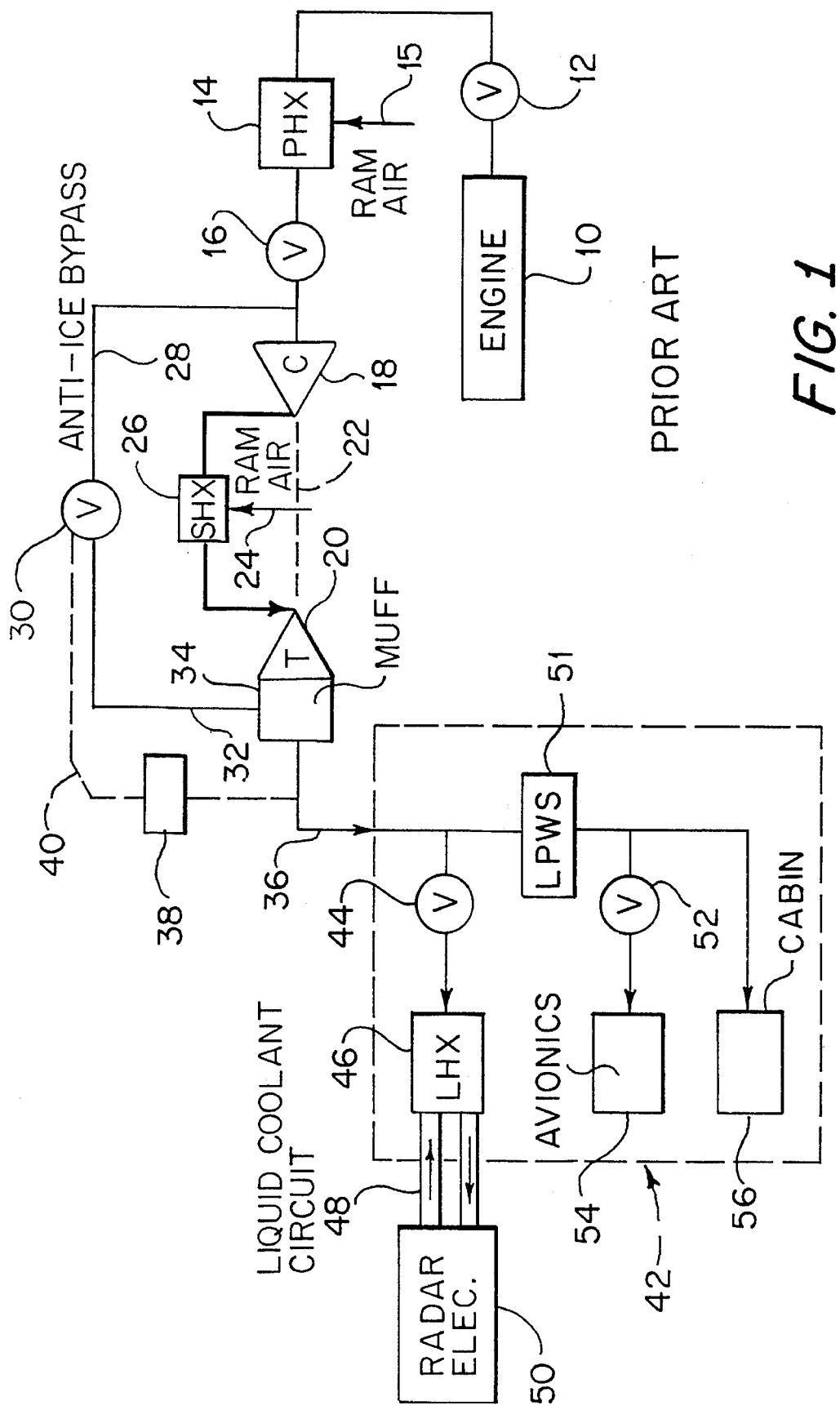
FIG. 1 is a block diagram of a typical open loop boot strap air cycle cooling system, such as employed in the F14 aircraft.

Referring to the figures, and more particularly FIG. 1 thereof, reference number 10 indicates a jet engine having its bleed pressure regulated with a valve 12. The resulting airflow undergoes cooling in a primary heat exchanger (PHX) 14 by introducing ram air at 15. An outlet valve 16 is located downstream of the PHX 14 for controlling total air conditioning. From the outlet of valve 16, the flow stream undergoes compression in a compressor 18 and then cooling in a secondary bleed air ram air heat exchanger (SHX) 26. Cooling ram air is introduced at inlet 24. The turbine 20 of the compressor-turbine pair receives the cool air of the SHX 26 and the resulting expanded air in the turbine exhibits still further temperature reduction. The dotted line 22 indicates the common shaft of the compressor-turbine pair.

The air from turbine 20 is at its coolest and serves as an excellent source for cooling radar electronics via a liquid coolant loop, forced-air cooled avionics, and the aircraft cabin. The radar electronics are cooled by a liquid coolant circuit 48 which is, in turn, cooled by turbine air via a liquid heat exchanger 46. However, it is important to ensure that the internal surfaces of all air conduits between the turbine and the liquid heat exchanger, the forced-air cooled avionics, and the cabin remain above freezing since they may otherwise allow ice build-up due to drops of moisture in the air.

The prior art approach includes the utilization of an anti-ice bypass of air exiting from valve 16, flowing through 28, 30, and 32, and mixing with turbine exhaust in the mixing muff 34. Hot air in bypass 28 undergoes flow control through valve 30 so that air temperature in muff 34 can be maintained at approximately 40° F. This heated air is introduced, via conduit 32, into an air-mixing chamber or muff 34 with anti-iced walls common with the turbine. This ensures that the turbine walls remain above freezing and consequently do not become iced themselves. A temperature feedback system is established between the air leaving the mixing chamber 34 and the valve 30. This is achieved by utilizing a thermostat 38 for sensing air temperature at the outlet 36 of the mixing chamber 34. A control signal can then be sent along line 40 from the thermostat to control airflow through valve 30.

A cooling load on the air conditioning system is generally indicated by reference numeral 42. Within 42, various loads are represented as receiving parallel flows of 40° F. air from the output of the turbine. Part of the cooling load is that of the radar electronics 50 liquid cooling system. A valve 44 is connected between the mixing chamber 34 and a liquid/air heat exchanger 46, the latter exchanger cooling liquid coolant flowing from a cooling jacket around the radar electronics 50 via flow path 48. Since the air to the liquid heat exchanger 46 has been heated above freezing by the anti-ice bypass 28, it is assured that the interior surfaces of the liquid heat exchanger 46 will not experience icing.

A low pressure water separator 51 is present between the outlet of mixing chamber 34 and two additional heat loads, namely forced-air cooled avionics (54) and the cabin (56). The water separator is needed to reduce moisture in the cabin and avionics to an acceptable amount. As will be appreciated, the cooling for the avionics and the cabin is direct air cooling. A valve 52 is inserted in the flow path between the low pressure water separator 51 and the avionics 54 to establish a preselected constant air flow rate to the avionics condition. A similar valve 44 is utilized to regulate the 40° F. air flow to the liquid heat exchanger 46. The liquid heat exchanger, avionics and cabin loads are cooled in parallel with approximately 40° F. air thereby preventing icing of the cooling conduits.

Figure 2:
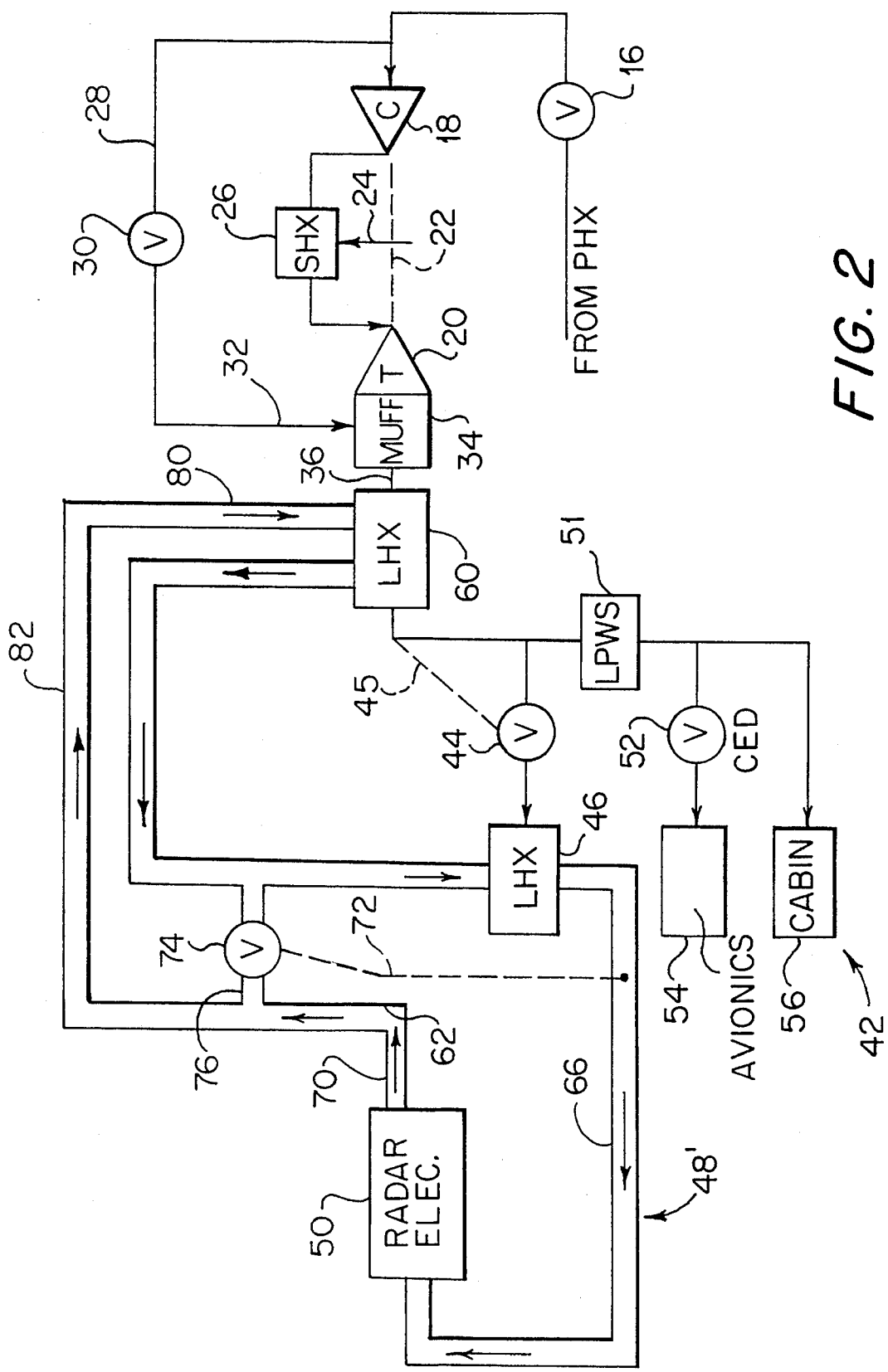
FIG. 2 is a block diagram of an improved cooling system for a similar type of aircraft.

The present invention as shown in FIG. 2 is directed to an improvement of the prior art cooling system so that the diversion of hot air through bypass 28 is minimized thereby improving system efficiency, particularly in respect of more full utilization of engine thrust for aircraft operational performance. In FIG. 2 components similar to those of FIG. 1 are represented by identical reference numerals. The improvement of FIG. 2 includes the incorporation of a liquid/air heat exchanger 60 in line with the outlet 36 of mixing chamber 34 and the previously mentioned liquid/air heat exchanger 46 which directly cools liquid coolant associated with the radar electronics 50. The flow path previously indicated by 48 in FIG. 1 is now elaborated as a loop 48' in FIG. 2. The previous anti-ice bypass 28 now serves to bypass only a trickle flow through valve 30 for maintaining the wall of turbine 20 above freezing, thereby preventing icing thereof. The bypass flow would revert to a full anti-icing function only if the liquid heat load was too small to heat turbine exhaust to 40° F. However, for the main part, the bypass flow is substantially reduced and heating turbine exhaust is accomplished by reheating air at the outlet 36 of mixing chamber 34 with a heat source, principally the heated coolant associated with radar electronics 50. Control of the heat exchanger 60 exhaust air to 40° F. is accomplished using valve 44, which effectively controls the turbine "backpressure;" this has a direct effect on turbine exhaust temperature. A thermostatic controlling link 45 regulates this condition. Valve 44 also determines the amount of airflow from the heat exchanger 60 to the heat exchanger 46.

In order for innovative utilization of liquid/air heat exchanger 60 to operate efficiently, hot liquid coolant flow is first directed from the radar load, where it has picked up heat from radar electronics and reaches typically 117° F., to heat exchanger 60. The hot liquid is directed first to the end 36 of heat exchanger 60 which faces the incoming icing stream, and then flows towards the exit end of heat exchanger 60. Heat exchanger 60 is therefore a parallel flow type configuration. After exiting heat exchanger 60, the partially cooled liquid flows to heat exchanger 46 where it is further cooled with 40° F. air. The liquid temperature returning to the radar load in leg 66 is controlled to 70° F.; this is accomplished using shuttle valve 74. Valve 74 controls the amount of liquid which flows through heat exchanger 60 by allowing some flow to bypass heat exchanger 60 via a bypass conduit 76. If valve 74 is fully closed, all liquid flows through heat exchanger 60. If valve 74 is fully open, none of the liquid flows through heat exchanger 60.

Valve 74 is controlled to respond to a sensor located in conduit 66. If the temperature in 66 is greater than 70° F., valve 74 will close slowly until the liquid in 66 returns to 70° F. If the liquid temperature is lower than 70° F., valve 74 will open slowly until the liquid is 70° F. in conduit 66. As valve 74 opens, the liquid load, which is shared by both heat exchangers 60 and 46, will be effectively shifted away from heat exchanger 60 and towards heat exchanger 46. As this happens, the air stream temperature exiting heat exchanger 60 will be reduced. This will in turn cause valve 44 to close in compensation to keep the air stream at 45 equal to 40° F. Valve 44 will therefore naturally respond to changes in valve 74.

Note that, as valve 44 opens or closes, the corresponding effect on cabin air flow is an increase or decrease, since these legs (conduits) are in parallel. The cabin temperature is maintained by valve 16, which regulates the total air flow through the air cycle machine. Changes in liquid load will therefore cause valve 74 to modulate via the liquid return temperature in conduit 66. This will cause valve 44 to modulate via changes in the air temperature at 45; and this will cause valve 16 to modulate via changes in the cabin temperature. This is the global view of how the anti-icing heat exchanger 60 can function within a typical military aircraft cooling system which features a large liquid heat load.

Note that, if the liquid load is not large enough to reheat the air stream (e.g. the radar is off and the only loads are the cabin and forced-air cooled electronics), then valve 74 would close, valve 44 would close, and valve 30 would function as in the prior art system.

By virtue of the foregoing description, a liquid/air heat exchanger system is described wherein the reheating of air at the outlet of a turbine accomplishes useful cooling and reduces bleed air usage by substantially reducing the hot bypass flow along 28 of the prior art as explained in connection with FIG. 1. The heat exchanger 60 is "run wet," that is, with all surfaces kept above 40° F. by virtue of the hot liquid, so that icing does not occur within heat exchanger 60. The air stream is also heated by 60° to 40° F. to maintain an anti-ice condition for the rest of the cold air distribution system.

It should be understood that the invention is not limited to the exact details of construction and controls shown and described herein for obvious modifications will occur to persons skilled in the art.

We claim:

1. An open loop aircraft cooling air system, the system employing an air source which is associated with a loss of thrust from the engine, an air cycle which cools the air to temperatures which are potentially below freezing temperatures (<32° F.) at the turbine outlet, and further comprising:

a liquid/air heat exchanger connected at the exit of the air cycle turbine which transfers heat to the turbine exhaust air in an amount sufficient to heat the air to above 40° F. at its exhaust, the heat exchanger being designed to maintain fin and wall surfaces at or above 40° F., given a source of liquid coolant flow supplied at a relatively high temperature compared to 40° F.;

a valve located downstream of the liquid/air heat exchanger in the air stream which is used to modulate the air stream pressure, and thus the air temperature at the exit of the liquid/air heat exchanger to a value which is marginally above freezing, the valve responding to a controller and temperature sensor located in the air stream downstream of the liquid/air heat exchanger;

an anti-icing bypass around the air cycle turbine and compressor assembly which normally supplies a small flow of hot air intended to anti-ice the walls of the turbine exit and provides a back-up mode capability wherein a larger flow of hot air is sent to mix with turbine exit air in the event of an abnormally small liquid coolant system heat load which is not capable of heating turbine exhaust air to 40° F.;

means for connecting the turbine outlet to an air intake of the liquid/air heat exchanger;

means for connecting the heat exchanger air outlet to the valve inlet and to an air distribution ducting system, the valve located in any leg of the air distribution system which has relatively low resistance to air flow between the valve and the outlet of the open system, resulting in relatively low back pressure on the turbine when the valve is fully open; and a liquid flow bypass and valve which permits a regulated flow of hot liquid to flow directly from the inlet of the liquid/air heat exchanger to the exit of the liquid/air heat exchanger, thus regulating the temperature of the liquid coolant on the cold side of the liquid coolant loop.

2. The system set forth in claim 1 together with temperature sensing means for controls including:

a sensor and controller which regulates the air valve based on the liquid/air heat exchanger exhaust air temperature; and a sensor and controller which regulates the valve in the liquid bypass based on the temperature returning to electronics in the liquid coolant loop.

3. The system set forth in claim 2, wherein the air valve is regulated to supply air at 40°.

4. The system set forth in claim 2, wherein the liquid bypass valve is regulated so that liquid in the coolant loop is supplied at 70°.

* * * * *